(12) United States Patent
Kim et al.

(10) Patent No.: US 8,666,151 B2
(45) Date of Patent: Mar. 4, 2014

(54) APPARATUS AND METHOD FOR ENHANCING VISIBILITY OF COLOR IMAGE

(75) Inventors: Joo Hyun Kim, Gyunggi-do (KR); Won Tae Choi, Gyunggi-do (KR); Bong Soon Kang, Busan (KR); Sung Mok Lee, Busan (KR); Won Woo Jang, Busan (KR); Hak Yong Han, Busan (KR)

(73) Assignees: Samsung Electro-Mechanics Co., Ltd., Gyunggi-Do (KR); Dong-A University Research Foundation for Industry-Academy Cooperation, Busan (KR)

( * ) Notice: Subject to any disclaimer, the term of this patent is extended or adjusted under 35 U.S.C. 154(b) by 362 days.

(21) Appl. No.: 12/929,036

(22) Filed: Dec. 23, 2010

(65) Prior Publication Data

US 2011/0249890 A1 Oct. 13, 2011

(30) Foreign Application Priority Data

Apr. 9, 2010 (KR) ........................ 10-2010-0032752

(51) Int. Cl.
*G06K 9/00* (2006.01)
(52) U.S. Cl.
USPC ........................................................ 382/162
(58) Field of Classification Search
None
See application file for complete search history.

(56) References Cited

U.S. PATENT DOCUMENTS

| | | | |
|---|---|---|---|
| 5,144,442 A * | 9/1992 | Ginosar et al. ............. | 348/222.1 |
| 5,963,665 A * | 10/1999 | Kim et al. ..................... | 382/169 |
| 6,078,686 A * | 6/2000 | Kim .............................. | 382/167 |
| 6,130,724 A | 10/2000 | Hwang | |
| 6,507,668 B1 * | 1/2003 | Park .............................. | 382/169 |
| 7,453,524 B2 * | 11/2008 | Lee et al. ..................... | 348/679 |
| 7,894,684 B2 * | 2/2011 | Monobe et al. ............. | 382/254 |
| 2002/0047911 A1 * | 4/2002 | Tsuchiya et al. ............. | 348/252 |
| 2002/0181024 A1 * | 12/2002 | Morimoto et al. ........... | 358/3.15 |
| 2004/0036704 A1 * | 2/2004 | Han et al. ..................... | 345/690 |
| 2004/0175054 A1 * | 9/2004 | Ogata et al. ................. | 382/274 |
| 2004/0246537 A1 * | 12/2004 | Ohyama et al. ............. | 358/479 |
| 2005/0104974 A1 * | 5/2005 | Watanabe et al. ........... | 348/222.1 |
| 2005/0207629 A1 * | 9/2005 | Toyoda ........................ | 382/128 |
| 2007/0036456 A1 * | 2/2007 | Hooper ........................ | 382/274 |
| 2007/0188623 A1 * | 8/2007 | Yamashita et al. ......... | 348/222.1 |
| 2008/0284914 A1 * | 11/2008 | Chen et al. .................... | 348/645 |

FOREIGN PATENT DOCUMENTS

KR 100243301 B1 2/2000

* cited by examiner

*Primary Examiner* — Bhavesh Mehta
*Assistant Examiner* — Feng Niu
(74) *Attorney, Agent, or Firm* — Lowe Hauptman & Ham, LLP (57) ABSTRACT

An apparatus for enhancing the visibility of color images includes: a luminance value cumulative distribution calculator that calculates a cumulative distribution function of the number of pixels from a minimum value of luminance values; a baseband signal determining unit that determines baseband signal pixels having luminance values smaller than a threshold level; a luminance compensation value generator that generates luminance compensation values to apply the lower-level luminance compensation values as the pixels have higher-level luminance values, for the pixels having the luminance values larger than the threshold level; a luminance gain generator that determines a luminance gain applied to the luminance compensation values according to a mean luminance values of the input images and the level of the luminance values of the pixels to which the luminance compensation values are applied; and a luminance value enhancing unit that summing the luminance compensation values including the gain with the luminance values.

11 Claims, 12 Drawing Sheets
(2 of 12 Drawing Sheet(s) Filed in Color)

APPARATUS AND METHOD FOR ENHANCING VISIBILITY OF COLOR IMAGE

CROSS-REFERENCE TO RELATED APPLICATIONS

This application claims the priority of Korean Patent Application No. 10-2010-0032752 filed on Apr. 9, 2010, in the Korean Intellectual Property Office, the disclosure of which is incorporated herein by reference.

BACKGROUND OF THE INVENTION

1. Field of the Invention

The present invention relates to an apparatus and a method for enhancing the visibility of color images, and more particularly, to an apparatus and a method for enhancing the visibility of color images by performing image processing on each pixel of continuously input color images in real time without additional hardware resources.

2. Description of the Related Art

Recently, the supply of and demand for a digital image photographing apparatus such as a digital still camera, a digital camcorder, and a mobile phone including a digital camera module are rapidly increasing. As a result, the functions of the digital image photographing apparatus have been increasingly diversified and sophisticated.

The digital image photographing apparatus includes an image pickup device, i.e., an image sensor that converts optical signals into electrical signals. As the performance of the image sensor is enhanced, the image sensor further expands the expression range (dynamic range) of the same images.

Generally, the dynamic range represents the difference between a maximum value and a minimum value of a luminance range that can be expressed by the sensor. While the human optic nerve does not have a limitation in dynamic range, the image sensor has a limitation in dynamic range at all times. Even though the performance of the recently developed high-performance image sensor is enhanced to have wide dynamic range, the image sensor has a limitation that is not beyond the dynamic range of a color negative film.

As described above, there has been a problem in that the digital image, photographing apparatus including the image sensor having a limitation in dynamic range acquires images in which bright regions and dark regions are distributed with wide variance in poor conditions such as backlight or the like is present or acquires images in which a background is very bright and a subject is very dark.

In order to solve the above-mentioned problem, various methods for enhancing visibility have been proposed. A hardware method and a software method have been known as a representative method for enhancing visibility. As for known algorithms (software method) for enhancing the visibility of images, there are a multi exposure synthesizing algorithm that photographs and synthesizes a single image at various illumination conditions, a histogram spreading method using histogram analysis, and a method for using a gamma curve, or the like. However, since the algorithms for enhancing visibility according to the related art consume a great deal of time to perform the operation and require complicated operations, the use of a separate microprocessor and an external memory is required in order to process the operation. In addition, the method for enhancing visibility using the histogram spreading and the nonlinear curve such as the gamma curve cannot simultaneously correct the bright portion and the dark portion of images, such that another deterioration phenomenon occurs during a process of enhancing the quality of an image.

Therefore, the methods for enhancing visibility according to the related art have a problem in that it is impossible to process pixels of input color images in real time and costs are increased due to expensive external circuits. Further, there is a problem in that the methods for enhancing visibility according to the related art have a limitation in being applied to a small-sized apparatus such as the mobile phone including the camera module.

Therefore, a need exists for new technology to solve the phenomenon of the deterioration of the visibility of color images that is generally caused due to the limitation in the dynamic range of the image sensor of the digital color image apparatus in the art.

SUMMARY OF THE INVENTION

An aspect of the present invention provides an apparatus and a method for enhancing the visibility of color images by performing image processing on each pixel of continuously input color images in real time without additional hardware resources.

According to an aspect of the present invention, there is provided an apparatus for enhancing the visibility of color images, comprising: a luminance value cumulative distribution calculator that calculates a histogram of the number of pixels for luminance values of input images and calculates a cumulative distribution function of the number of pixels from a minimum value of the luminance values by using the histogram; a baseband signal determining unit that determines the luminance values corresponding to the number of pixels according to a previously set ratio to have the small luminance values in the luminance value cumulative distribution function as a threshold level for determining the baseband signals and determines the pixels having luminance values smaller than the threshold level to be the baseband signal pixels; a luminance compensation value generator that generates luminance compensation values to apply the lower-level luminance compensation values as the pixels have higher-level luminance values, for the pixels having the luminance values larger than the threshold level; a luminance gain generator that determines a luminance gain applied to the luminance compensation values according to the mean luminance values of the input images and the level of the luminance values of the pixels to which and the luminance compensation values are applied; and a luminance value enhancing unit that multiples the luminance compensation values by the gain and sums the luminance compensation values multiplied by the gain with the luminance values of the input images.

The cumulative distribution calculator may include a color space converter that converts a color space of the input images into a YCbCr color space.

The previously set ratio is determined as 1 to 5% of a total number of pixels having the input images.

The luminance compensation generator may generate the luminance compensation values by the following Equations 1 to 3.

$$P = (1 - Y/Y_{max})^\gamma \times T_{max} \qquad \text{Equation 1}$$

$$P' = \frac{P \times (Y_{max} - Y)}{T_{max}} \qquad \text{Equation 2}$$

$$P_{final} = \left(\frac{P'}{Y_{max}}\right)^2 \times Y \qquad \text{Equation 3}$$

In Equations 1 to 3, Pfinal represents the luminance compensation values, Y represents the luminance values of the pixels, Ymax represents the maximum value in the luminance value range that can be included in the pixel, γ is a number that is optionally determined according to the design of the user to have a size larger than 0 and smaller than 1.

The luminance gain generator may generate the luminance gain so that the luminance gain and the level of the luminance values of the pixels have the relation of a linear function having a slope and an intercept determined by a mean luminance value of the input images. The maximum value and the minimum value of the luminance gain may be previously set and the previously set maximum value and minimum value may be determined as the luminance gain, for the pixels whose luminance gain is out of the previously set maximum value or minimum value according to the linear function.

The luminance gain generator may generate the larger luminance gain as the pixels have the low-level luminance values for the dark image whose mean luminance value is lower than the previously set reference value and set the smaller luminance gain as the pixels have the low-level luminance values for the bright image whose mean luminance value is higher than the previously set reference value.

The apparatus for enhancing the visibility of color images may further include a color value enhancing unit that calculates a size ratio of the luminance values of each pixel of the input images and the luminance values of each pixel of the images output from the luminance value enhancing unit and changes the color values by applying the size ratio to the color values of each pixel. The color value enhancing unit may apply the color gain determined as the larger values as the pixels have the low-level luminance values to the size ratio to change the color values.

The color value enhancing unit may output the color values determined by the following Equations 7 to 9.

$$Y_{ratio} = \frac{Y_{final}}{Y} \quad \text{Equation 7}$$

$$Cb_c = Cb \times Y_{ratio} \quad \text{Equation 8}$$
$$Cr_c = Cr \times Y_{ratio}$$

$$Cb_{final} = G_{color} \times Cb_c \quad \text{Equation 9}$$
$$Cr_{final} = G_{color} \times Cr_c$$

In Equations 7 to 9, Yratio represents the size ratio of the luminance values of the images output from the luminance value enhancing unit and the luminance values of the input images, Yfinal represents the luminance values of the images output from the luminance value enhancing unit, Cbc and Crc represent the compensation values for enhancing the color values, Cb and Cr represent the color values of the input images or the image data output from the luminance value enhancing unit, Cbfinal and Crfinal represent the color values output from the color value enhancing unit, and Gcolor represents the color gain.

According to another aspect of the present invention, there is provided a method for enhancing the visibility of color images, including: calculating histogram of the number of pixels for luminance values of input images and calculating a cumulative distribution function of the number of pixels from a minimum value of the luminance values by using the histogram; determining the luminance Values corresponding to the number of pixels according to a previously set ratio to have the small luminance values in the luminance value cumulative distribution function as a threshold level for determining the baseband signals and determining the pixels having the luminance values smaller than the threshold level to be the baseband signal pixels; generating luminance compensation values to apply the lower-level luminance compensation values as the pixels have higher-level luminance values, for the pixels having the luminance values larger than the threshold level; determining a luminance gain applied to the luminance compensation values according to the mean luminance values of the input image and the level of the luminance values of the pixels to which the luminance compensation values are applied; and generating the images with the enhanced luminance values by multiplying the luminance compensation values by the gain and summing the luminance compensation values multiplied by the gain with the luminance values of the input images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, various exemplary embodiments of the present invention will be described with reference to the accompanying drawings. However, the exemplary embodiments of the present invention may be modified in many different forms and the scope of the invention should not be limited to the embodiments set forth herein. Rather, these exemplary embodiments are provided so that this disclosure will be thorough and complete, and will fully convey the concept of the invention to those skilled in the art. Therefore, it is to be noted that the shape and size of components shown in the drawings can be exaggerated in order to provide more clear description.

Figure 1:
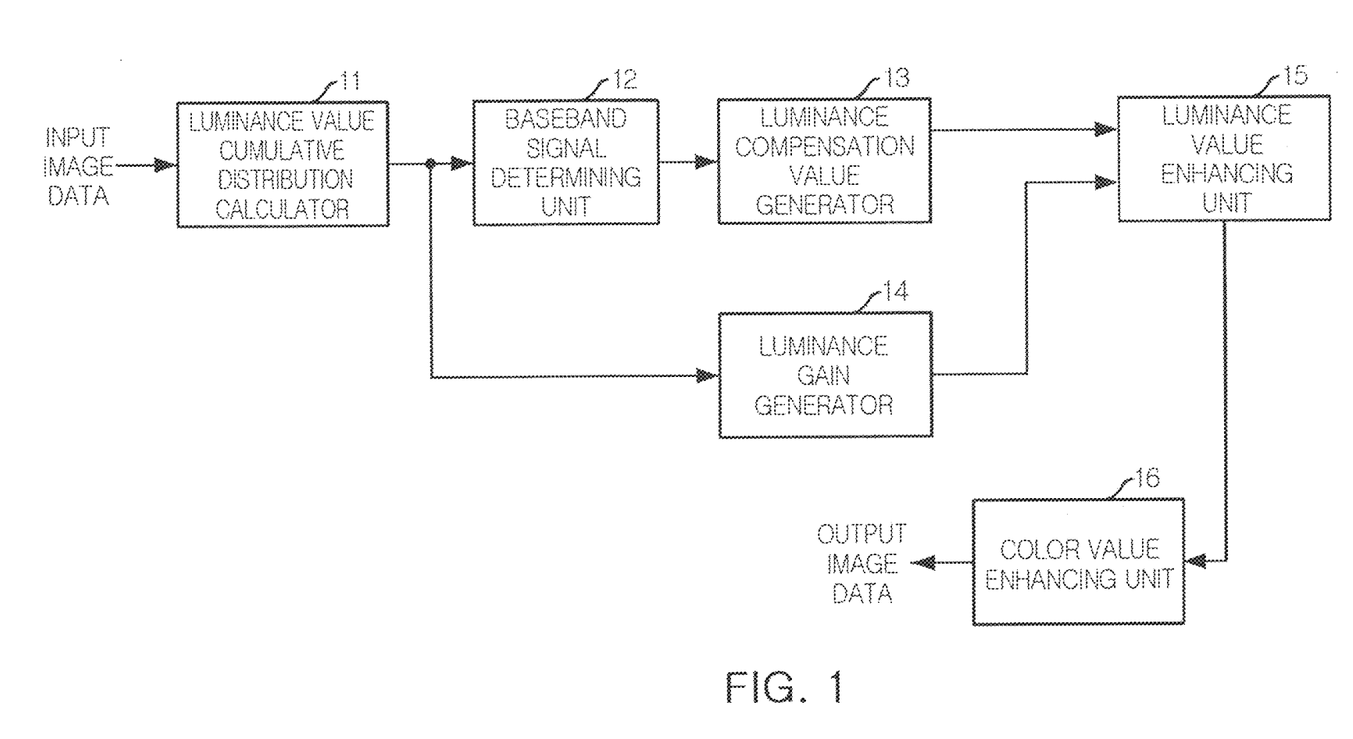
FIG. 1 is a block configuration diagram showing an apparatus for enhancing the visibility of color images according to an exemplary embodiment of the present invention.

FIG. 1 is a block configuration diagram showing an apparatus for enhancing the visibility of color images according to an exemplary embodiment of the present invention.

As shown in FIG. 1, an apparatus for enhancing the visibility of color images according to an exemplary embodiment of the present invention may be configured to include a luminance value cumulative distribution calculator 11, a baseband signal determining unit 12, a luminance gain generator 14, and a luminance value enhancing unit 15. In addition, this exemplary embodiment may be configured to further include a color value enhancing unit 16.

The luminance value cumulative distribution calculator 11 prepares a histogram representing a frequency (the number of pixels) of luminance value (Y value) of input images and generates a cumulative histogram representing cumulative distribution of the prepared histogram. For example, when the input image data is represented as an RGB color space, the luminance value cumulative distribution calculator 11 may include a color space converting unit (not shown) that converts the RGB color space into an YCbCr color space. Further, the luminance value cumulative distribution calculator 11 may include a luminance value histogram calculator (not shown) that represents the frequency of the luminance value (Y value) of each pixel of the input image data. In addition, the luminance value cumulative distribution calculator 11 may include the cumulative distribution function calculator (not shown) that uses the histogram calculated in the luminance value histogram calculator to calculate the cumulative distribution function of the pixel for each luminance value. The cumulative distribution function may be a function obtaining the cumulative distribution from small luminance values to large luminance values.

Figure 3:
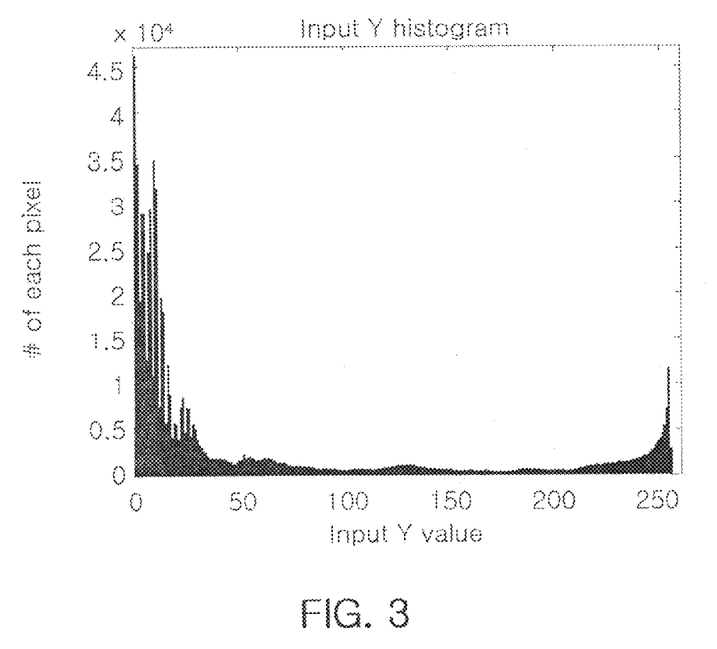
FIG. 3 is a diagram showing an example of a luminance value histogram of input image data calculated by a luminance value cumulative distribution calculator in the exemplary embodiment of the present invention.
Figure 4:
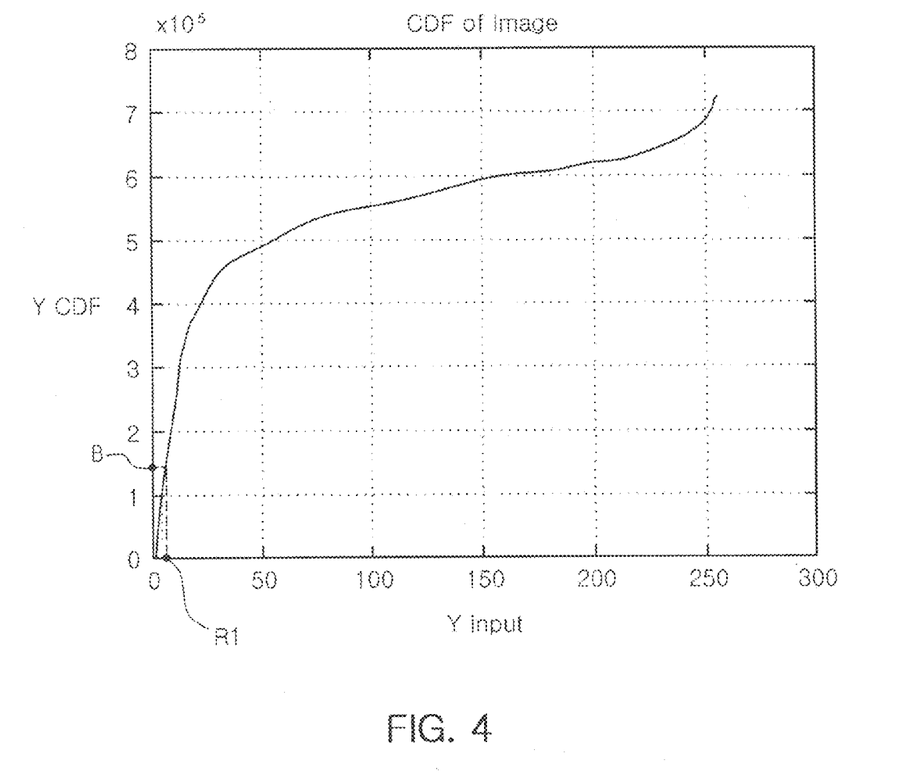
FIG. 4 is a diagram showing a cumulative distribution function calculated by using the luminance value histogram of FIG. 3.

FIG. 3 is a diagram showing an example of the luminance value histogram of the input image data calculated by the luminance value cumulative distribution calculator 11 in the exemplary embodiment of the present invention and FIG. 4 is a diagram showing the cumulative distribution function of the luminance value histogram of FIG. 3.

As shown in FIG. 3, the luminance value cumulative distribution calculator 11 may calculate the luminance value histogram that considers the luminance values of the input image data as an x-axis and the frequency of the pixels having the corresponding luminance values as a y-axis. Thereafter, as shown in FIG. 4, the luminance value cumulative distribution calculator 11 may calculate the cumulative distribution function representing the cumulative distribution for each luminance value from the luminance value histogram. In other words, it can be appreciated from FIG. 4 that a y-axis represents the number of pixels having the luminance values less than luminance values representing on an x-axis. For example, it can be appreciated from FIG. 4 that the number of pixels having the luminance values less than luminance values of 150 is approximately 600,000.

The baseband signal determining unit 12 uses the cumulative distribution function calculated in the luminance value cumulative distribution calculator 11 to determine pixels corresponding to a predetermined ratio from the minimum value of the luminance values as the pixel (baseband signal pixel) that outputs the baseband signals among all the pixels. In other words, the baseband signal determining unit 12 may determine the luminance values corresponding to the number of pixels according to a previously set ratio to have the small luminance values in the cumulative distribution function as a threshold level for determining the baseband signals and determine the pixels having luminance values smaller than the threshold level to be the baseband signal pixels.

In FIG. 4, 'B' represented on a Y-axis represents a value corresponding to the number of pixels according to the previously set predetermined ratio among a total number of pixels and 'R1' represented on an X-axis represents the threshold level of the luminance values for determining the baseband signals corresponding to the number of pixels according to the predetermined ratio. In other words, in the example shown in FIG. 4, the baseband signal determining unit 12 may determine the pixels representing the luminance values smaller than the threshold level R1 of the luminance values represented by the number of pixels B having the previously set ratio in the cumulative distribution function as the pixels outputting the baseband signals. The pixels outputting the baseband signals are pixels corresponding to the predetermined ratio set to have the small luminance values among the pixels of the input images. It cannot generate compensation values for compensating for the luminance later, for the pixels determined as the pixels outputting the baseband signals.

It is preferable that the previously set ratio of the number of pixels of the input images is determined in a range of approximately 1 to 5% of a total number of pixels in order that it is determined that the baseband signals are output from the baseband signal determining unit 12.

The luminance compensation value generator 13 generates the luminance compensation values to enhance the luminance values for the pixels having the luminance values larger than the threshold level determined by the baseband signal determining unit 12. A basic principle is that the luminance compensation values for enhancing the luminance values applies the small compensation values for the high-level luminance values and applies the large compensation values for the low-level luminance values. To this end, the luminance compensation values may be determined by the following Equations 1 to 3.

$$P = (1 - Y/Y_{max})^\gamma \times T_{max} \qquad \text{Equation 1}$$

$$P' = \frac{P \times (Y_{max} - Y)}{Y_{max}} \qquad \text{Equation 2}$$

$$P_{final} = \left(\frac{P'}{Y_{max}}\right)^2 \times Y \qquad \text{Equation 3}$$

Figure 5:
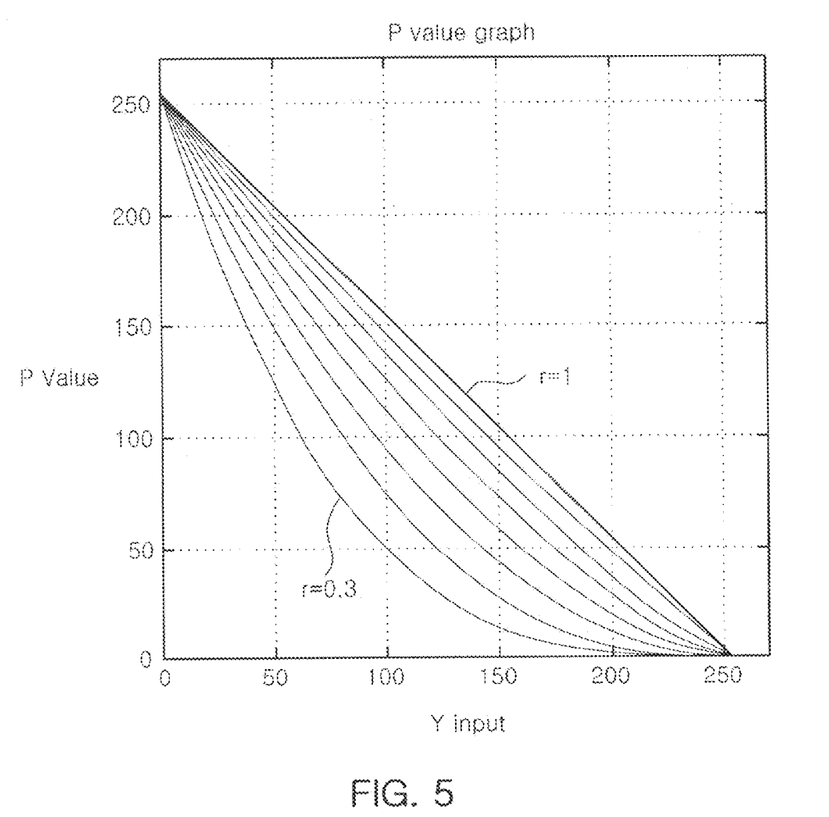
FIG. 5 is a diagram for explaining a technology of determining luminance compensation values in the exemplary embodiment of the present invention.

In Equations 1 to 3, Pfinal represents the luminance compensation values of the pixel, Y represents the luminance values of the pixels, Ymax represents the maximum value in the luminance value range that can be included in the pixel, γ is any values selected by the user and may have values larger than 0 and smaller than 1. An example of the P values determined by Equation 1 is shown in FIG. 5. FIG. 5 shows an example in which the luminance values, or the like are applied based on 8 bits, that is, the luminance values are represented as 0 to 255, that is, a total of 256 (=28) values. In FIG. 5, an X-axis represents the luminance values of the pixel and a Y-axis represents the P values of the pixel. As shown in FIG. 5, according to Equation 1, the large P values are applied to the pixels having a low-level luminance values to make the variations of the luminance values large and the small P values are applied to the high-level luminance values to make the variations of the luminance values small. Further, according to Equation 1, the γ value may be appropriately set according to various environments in which the images are acquired in order to variously change and apply the form of the non-linear curve and when the γ value is set to 1, it may be substituted into the simple subtraction (P=Ymax−Y), thereby making it possible to reduce the required calculations. Further, the P' values are determined according to Equation 2 so that the small P' values are applied to the pixels having the large luminance values and the large P' values are applied to the pixels having the small luminance values and the Pfinal values that are the finally determined luminance compensating values of the pixels are determined by squaring and applying the P' values to apply the large compensation values to the pixels having the low-level luminance values and to further reduce the compensation values for the pixels having the high-level luminance values.

Figure 6:
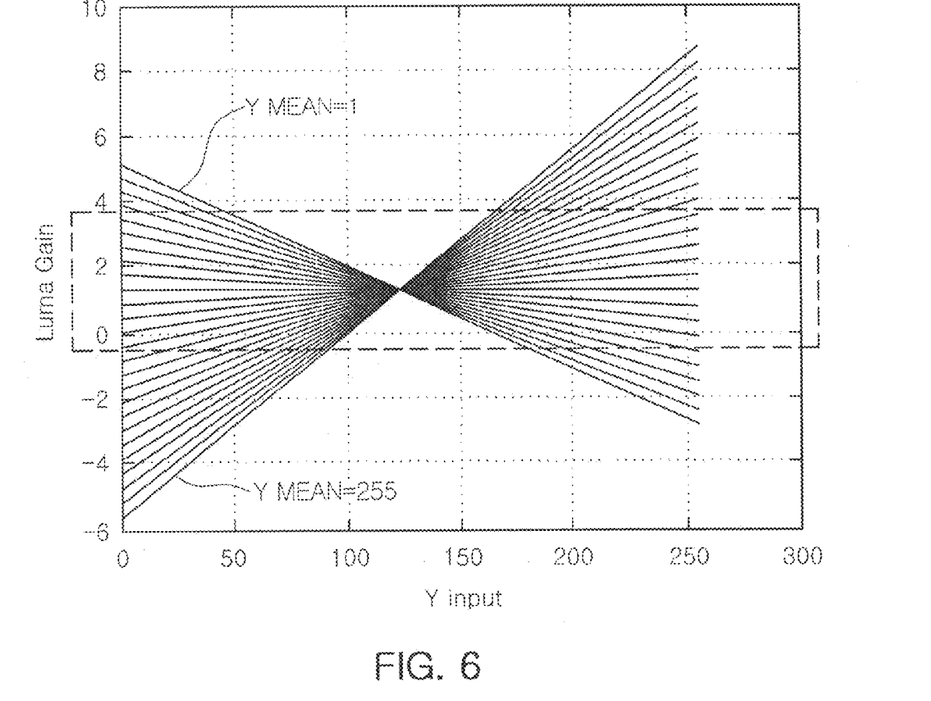
FIG. 6 is a diagram showing an example of a luminance gain in a linear function form having a slope and an intercept determined by a mean luminance value of input images used in a luminance gain generator according to the exemplary embodiment of the present invention.

The luminance gain generator 14 calculates the luminance gain applied to the luminance compensating values generated from the luminance compensation value generator 13. The luminance gain determined in the luminance gain generator 14 may be determined according to the mean luminance value of the input image and the level of the luminance values of the pixels to which apply the luminance compensation values are applied. In more detail, the relation between the luminance gain and the level of the luminance values of the pixels may be determined in a form of a linear function having a slope and an intercept determined by the mean luminance value of the input images. FIG. 6 is a graph showing an example of the luminance gain in a form of a linear function having a slope and an intercept determined by the mean luminance value of the input images. The luminance gain graph shown in FIG. 6 may be determined by the following Equations 4 to 6.

$$S = \frac{32}{256} \times (Y_{mean} - 70) - 2.5 \quad \text{Equation 4}$$

$$I = -\frac{15}{256} \times (Y_{mean} - 70) + 3 \quad \text{Equation 5}$$

$$G = \frac{S}{256} \times Y + 1 \quad \text{Equation 6}$$

In Equations 4 to 6, S represents the slope, I represents the intercept, Ymean is the mean luminance value of the input images, G represents the luminance gain, and Y represents the luminance value of the pixels. In addition, the numerical values represented in the above Equations 4 to may be the values that can be changed according to applications to which the present invention is applied during the optimization process in the design. As shown in Equation 6, the luminance gain G and the luminance values Y of the pixels have the correlation of the linear function. It can be confirmed that this slope and intercept of the linear function may be determined by the mean luminance value of the input images.

Referring to FIG. 4, when the mean luminance value of the input images is 1 (minimum value), the pixel in which the level of the luminance values is 1 may have the largest luminance gain and when the level of the luminance values is 255, the pixel may have the smallest luminance gain. In addition, when the mean luminance value of the input images is 255 (maximum value), the largest luminance gain may be applied to a pixel in which the level of the luminance values is 255 and the smallest luminance gain may be applied to a pixel in which the level of the luminance values is 1. In other words, for the dark image having the low mean luminance value, the large luminance gain may be applied to the pixel having the low-level luminance values and the small luminance gain may be applied to the pixel having the high-level luminance values. In addition, for the bright image having the high mean luminance value, the small luminance gain may be applied to the pixel having the low-level luminance values and the high luminance gain may be applied to the pixel having the high-level luminance values. The luminance gain is a gain that is applied to the luminance compensation values obtained by Equation 3 and the luminance compensation values are determined to have the large compensation values for the dark pixel and the small compensation values for the bright pixel. The dark pixel in the dark image can be subjected to the compensation of the larger luminance values by applying the large gain to the compensation values, as compared to the bright pixel in the dark image. The bright pixel in the bright image can be subjected to the compensation of the larger luminance values by applying the large gain to the compensation values applied to the pixels.

Further, as shown by a dotted line in FIG. 4, the maximum value and the minimum value of the luminance gain are previously set and when the luminance gain values determined by Equations 4 to 6 are beyond the maximum value or the minimum value, the previously set maximum value and minimum value can be applied. Instead of the method for previously setting the maximum value and the minimum value of the luminance gain, the upper and lower limits of the luminance gain values can be limited by the method for previously setting the maximum value and the minimum value of the mean luminance value of Equations 4 and 5.

Figure 7:
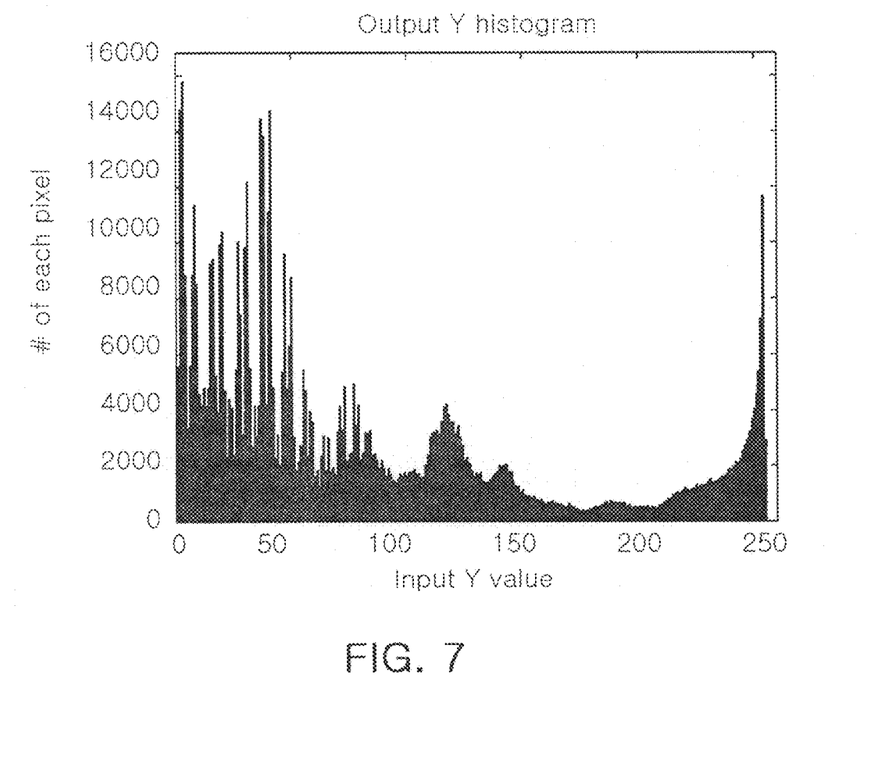
FIG. 7 is a diagram showing the luminance value histogram of the images with the enhanced luminance value output as a result of applying the input images having the luminance value histogram shown in FIG. 3 to the apparatus for enhancing the visibility of color images according to the exemplary embodiment of the present invention.

The luminance value enhancing unit 15 multiples the luminance gain determined in the luminance gain generator 14 by the luminance compensation values determined in the luminance compensation value generator 13 and sums the multiplied values to the luminance values of the input images to generate the image data with the enhanced luminance values. FIG. 7 shows the luminance value histogram of the image data output after the apparatus for enhancing the visibility according to the present invention is applied to the input image data having the luminance value histogram shown in FIG. 3. As shown in FIG. 7, when the apparatus for enhancing the visibility according to the present invention is applied, the luminance value distribution of the pixel concentrated in the region having the small luminance values and the region having the large luminance values is expanded to the relatively wider luminance value region, such that it can be confirmed that the visibility is enhanced.

Meanwhile, the present invention performs the compensation on the luminance values by the luminance value cumulative distribution calculator 11, the baseband signal determining unit 12, the luminance compensation value generator 13, the luminance gain generator 14, and the luminance value enhancing unit 15, thereby making it possible to enhance the visibility of the color image; however, the present invention performs only the compensation on the luminance values, thereby leading to a mismatch in the colors of the output images. Therefore, the exemplary embodiment of the present invention can enhance the color values for the images subjected to the compensation of the luminance values.

The enhancement of the color values may be made by the color value enhancing unit 16. The color value enhancing unit 16 calculates the luminance value changing ratio of the input image data and the image data output from the luminance value enhancing unit 15, thereby making it possible to change the color values by the method of applying the ratio to the color signals. In particular, the color value enhancing unit 16 applies the higher gain since the pixels having the low-level luminance values have the relatively low-level color values and applies the lower gain since the pixels having the high-level luminance values have the normal-level color values, thereby making it possible to prevent the excessive change in the colors.

The color value enhancing unit 16 can enhance the color values of the images output from the luminance value enhancing unit 15 by the following Equations 7 to 9.

$$Y_{ratio} = \frac{Y_{final}}{Y} \quad \text{Equation 7}$$

$$Cb_c = Cb \times Y_{ratio} \quad \text{Equation 8}$$
$$Cr_c = Cr \times Y_{ratio}$$

$$Cb_{final} = G_{color} \times Cb_c \quad \text{Equation 9}$$
$$Cr_{final} = G_{color} \times Cr_c$$

In Equations 7 to 9, Yratio represents the size ratio of the luminance values of the image data output from the luminance value enhancing unit 15 and the luminance values of the input image data, Yfinal represents the luminance values of the image data output from the luminance value enhancing unit 15, Cbc and Crc represent the compensation values for enhancing the color values, Cb and Cr represent the color values of the input image data or the image data output from the luminance value enhancing unit 15, Cbfinal and Crfinal represent the final color values with the enhanced luminance values, and Gcolor represents the gain applied to the color compensation values determined according to the luminance values of the image data output from the luminance value enhancing unit 15.

As shown in Equations 7 to 9, the color value enhancing unit 16 determines the color value Cbc and the compensation value Crc for each pixel according to the ratio of the luminance values of the input image data and the luminance values of the image data output from the luminance value enhancing unit 15 and may determine the color values Cbfinal and Crfinal in which the colors are finally enhanced by applying the color gain G color determined according to the luminance values of each pixel of the image data output from the luminance value enhancing unit 15 to the color values and the compensation values.

Figure 9:
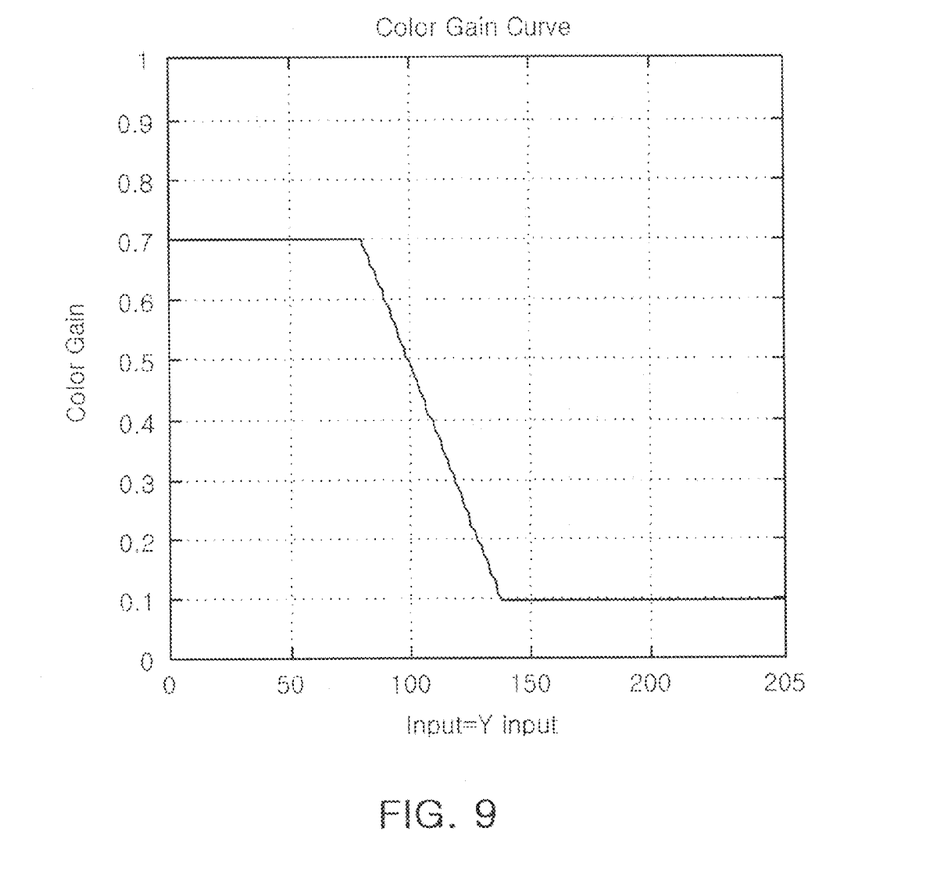
FIG. 9 is a diagram showing an example of a color gain G color used during a process of enhancing color values using a color value enhancing unit according to the exemplary embodiment of the present invention.

FIG. 9 shows an example of the color gain G color which the color value enhancing unit 16 applies. As shown in FIG. 9, the large color gain may be applied to the pixels having the low-level luminance values and the high color gain may be applied to the pixels having the high-level luminance values. This is to further increase the effect of enhancing the colors by applying the high gain since the pixels having the low-level luminance values have the relatively low-level color values and this is to prevent the excessive change in colors by applying the small gain since the pixels having the high-level luminance values have the normal-level color values.

Figure 10A:
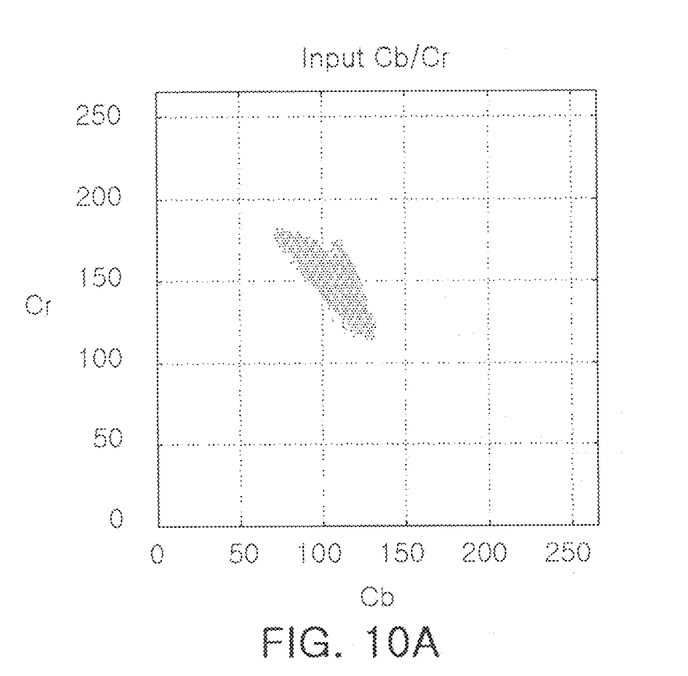
FIGS. 10A and 10B are diagrams comparing color value distribution of images input to a color value enhancing unit with colors of output images in the exemplary embodiment of the present invention.
Figure 10B:
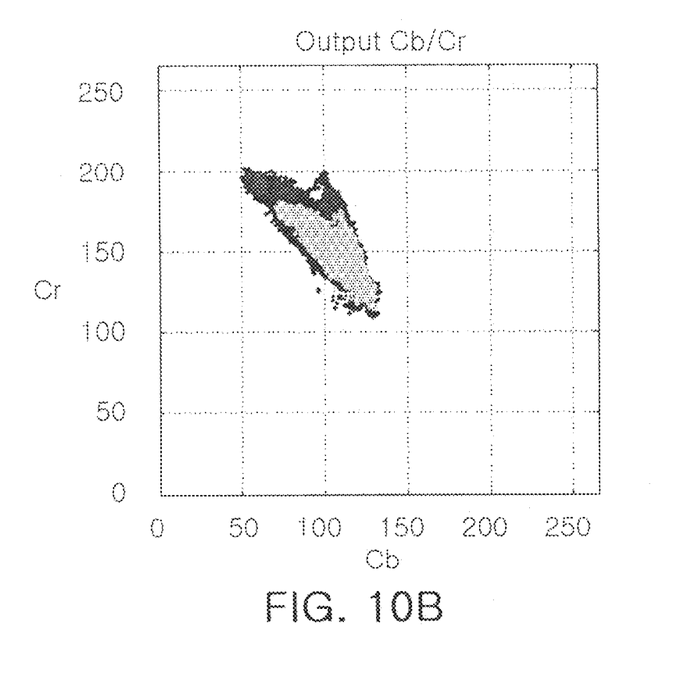

FIGS. 10A and 10B are diagrams comparing the color value distribution of images input to the color value enhancing unit with the colors of the output images. It can be appreciated from FIGS. 10A and 10B that the color value distribution of images with the enhanced color values by the color value enhancing unit 16 is expanded as compared to the images input to the color value enhancing unit 16.

Figure 2:
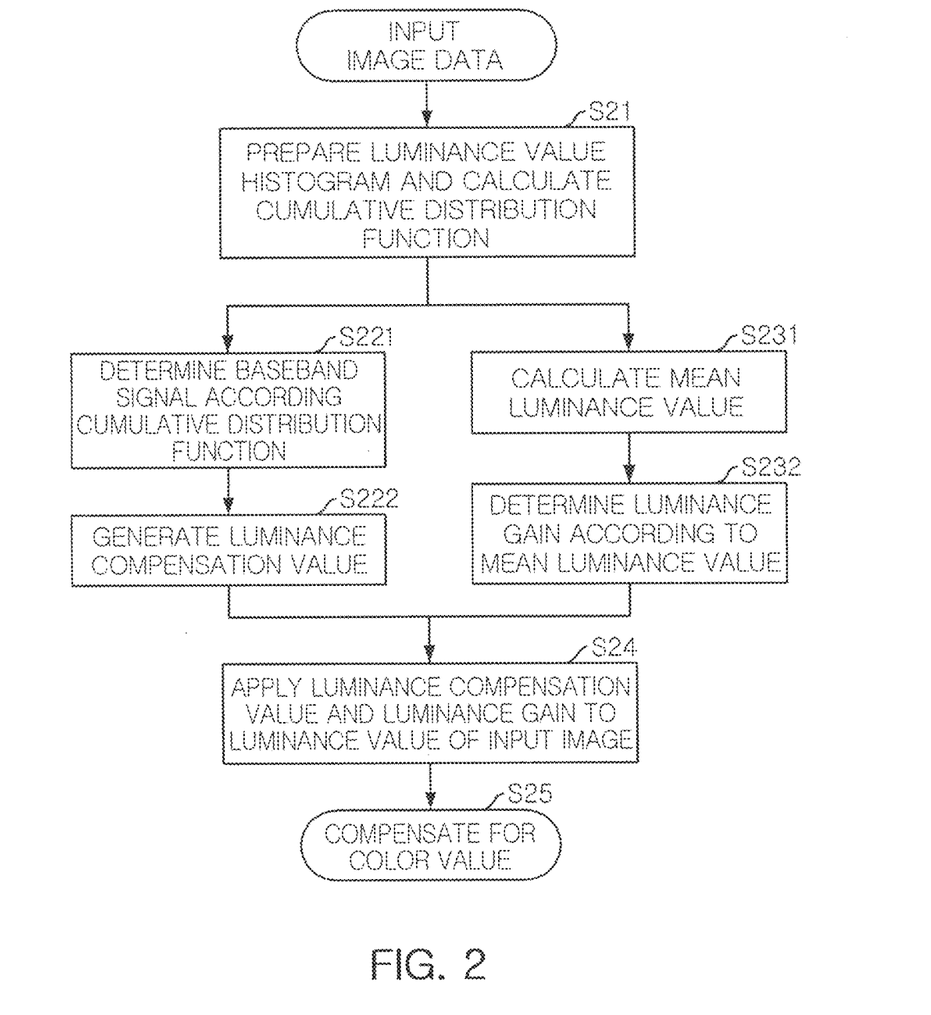
FIG. 2 is a flow chart showing a method for enhancing luminance values among the method for enhancing the visibility of color images according to the exemplary embodiment of the present invention.
Figure 8:
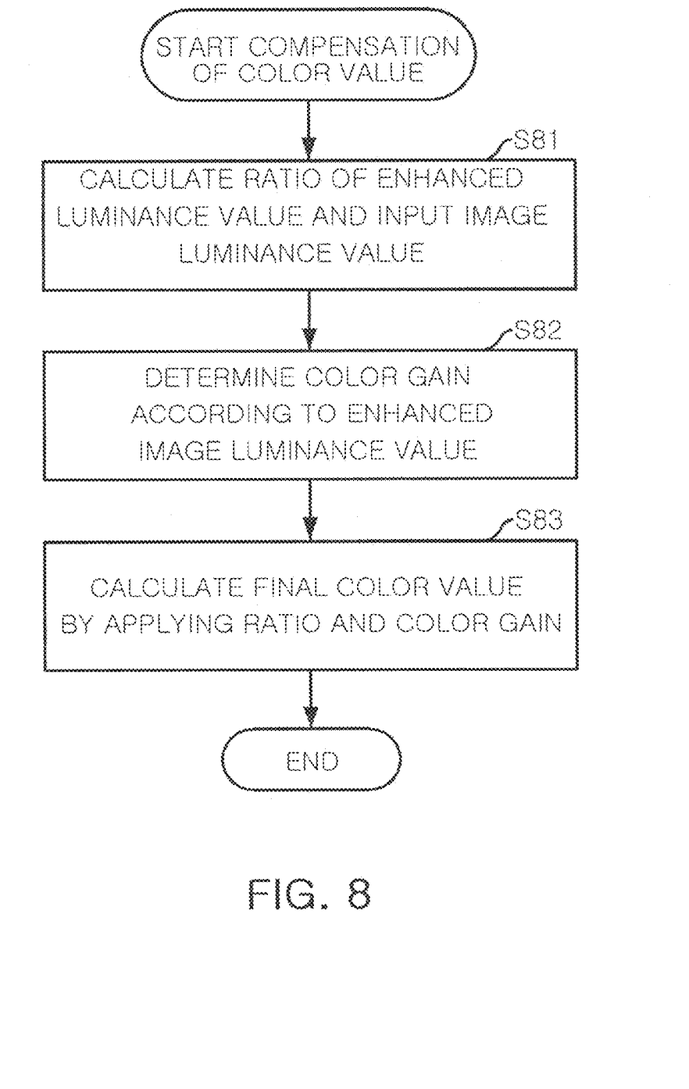
FIG. 8 is a flow chart showing a method for enhancing color values among the methods for enhancing the visibility of color images according to the exemplary embodiment of the present invention.

The present invention can provide the method for enhancing the visibility of color images using the apparatus for enhancing the visibility of color images according to the present invention having the above-mentioned configuration. FIGS. 2 and 8 each show a method for enhancing luminance values and a method for enhancing color values among the method for enhancing the visibility of color images according to the exemplary embodiment of the present invention. The apparatus and method for enhancing the visibility of color images according to the exemplary embodiment of the present invention will be described in detail with reference to the accompanying drawings.

Referring first to FIGS. 1 and 2, when the input image data are input, the cumulative distribution function representing the number of cumulative pixels is calculated from the minimum luminance value by preparing the luminance value histogram for the input image data and using the prepared luminance value histogram (S21). Step S21 may be performed by the luminance value cumulative distribution calculator 11. The present invention controls the luminance values (Y values) and the color values (Cb value and Cr value) of the image data in order to enhance the visibility of the images, such that it is preferable that the input image data is data represented as the YCbCr color space. When the input image data are not data represented as the YCbCr color space, a step of converting the color space of the input image data into the YCbCr color space followed by step S21 may be added.

Thereafter, the baseband signal pixel is determined according to the previously set ratio of the total number of pixels of the input images by using the cumulative distribution function calculated by step S21 (S221). Step S221 may be performed by the baseband signal determining unit 12. At step S221, the pixels corresponding to the previously set ratio are output as the baseband signals to the pixels with the small luminance values among all the pixels by using the cumulative distribution function. This may be more clearly understood with reference to FIG. 4. During step S221, the pixels representing the luminance values smaller than the threshold level R1 of the luminance values represented by the number of pixels B of the previously set ratio may be determined as the baseband signal pixels.

Thereafter, the luminance compensation values for enhancing the luminance values for the pixels other than the baseband signal pixels determined at step S221 may be generated (S222). Step S222 may be performed by the luminance compensation value generator 13. At step S222, the luminance compensation values may be determined so that the small compensation values are applied to the high-level luminance values and the large compensation values are applied to the low-level luminance values. Step S222 may be understood as a step of generating the luminance compensation values according to the foregoing Equations 1 to 3. The generation of the luminance compensation values executed at step S222 may be substantially the same as the process of generating the luminance compensation values that is described in detail in the description of the above-mentioned luminance compensation value generator 13.

Meanwhile, in order to determine the luminance gain applied to the luminance enhancing values of the input images, a step (S231) of calculating the mean of the luminance values of the input images can be executed after the above-mentioned step S21. Thereafter, the luminance gain to be applied to the luminance compensation values determined at step S222 may be determined by the method as shown in Equations 4 to 6 by using the mean luminance value of the input images calculated in step S231 (S232). Steps S231 and S232 may be performed by the luminance gain generator 14. The generation of the luminance gain executed at step S232 may be substantially the same as the process of generating the luminance gain that is described in detail in the description of the above-mentioned luminance gain generator 14.

Next, the compensation of the luminance values of the images for enhancing the visibility of color images is completed by mutually multiplying the luminance compensation values and the luminance gain that are generated at steps S222 and S232 and summing the multiplied results with the luminance values of the input image (S24).

Since the mismatch may occur in the colors of the images by the processes of compensating for the luminance values as described above, the exemplary embodiment of the present invention may precede the processes of performing the compensation of the color values on the images subjected to the compensation of the luminance values (S25). The process of compensating for the color values is shown in detail in FIG. 8.

The method for enhancing the visibility of color images according to the exemplary embodiment of the present invention may perform the process of performing the compensation of the color values as shown in FIG. 8 on the images subjected to the process of compensating for the luminance values of the input images as shown in FIG. 2. The processes shown in FIG. 8 may be performed in the color value enhancing unit 16 shown in FIG. 1.

First, the process of compensating for the color values calculates the ratio of the luminance values of the images subjected to the compensation of the luminance value by the process of compensating for the luminance values of FIG. 2 and the luminance values of the initial input images (S81). This may depend on the foregoing Equation 7.

Thereafter, the color gain determined according to the luminance values of the images subjected to the compensation of the luminance values by the process of compensating for the luminance values of FIG. 2 is determined (S82). An example of the color gain G color determined at step S82 is shown in FIG. 9. As shown in FIG. 9, the large color gain may be applied to the pixels having the low-level luminance values and the high color gain may be applied to the pixels having the high-level luminance values. Since the pixels having the low-level luminance values have the relatively low-level color values, this is to increase the effect of the color enhancement by applying the high gain and since the pixels having the high-level luminance values have the normal-level color values and this is to prevent the excessive change in the colors by applying the small gain.

Thereafter, the final color values is determined by multiplying the color values of the images subjected to the compensation of the luminance values by the process of compensating for the luminance values of FIG. 2 by the ratio calculated at step S81 and the color gain calculated by step S82 (S83).

Figure 11A:
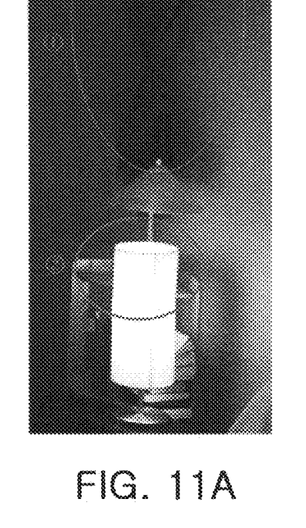
FIGS. 11A to 11C are diagrams comparing the input images with images having the enhanced luminance values according to the exemplary embodiment of the present invention and the images having both the enhanced luminance values and the color values according to the exemplary embodiment of the present invention.
Figure 11B:
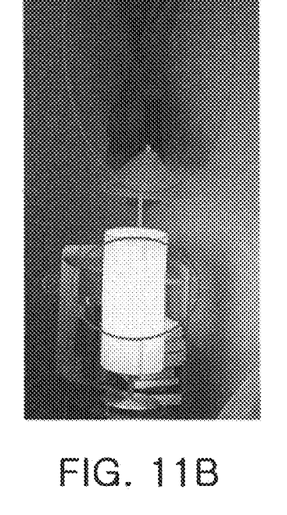
Figure 11C:
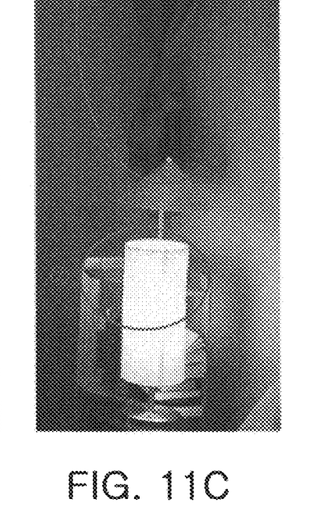

FIGS. 11A to 11C are diagrams comparing input images with images having enhanced luminance values and images having both enhanced luminance values and enhanced color values. As shown in FIG. 11A, the method for enhancing the luminance values according to present invention is applied to the original input images, which are in turn output as the images as shown in FIG. 11B. When the method for enhancing the color values according to the present invention is retroactively applied to the images of FIG. 11B, the images are converted into the images as shown in FIG. 11C. The difference between the regions represented by ① and ② can be appreciated from FIGS. 11A to 11C. In other words, it can be appreciated that the detail of the dark region ① is more clearly shown by enhancing the luminance values of the images shown in FIG. 11B, as compared to the images shown in FIG. 11A. Meanwhile, the color representation is slightly distorted by enhancing only the luminance values of the images shown in FIG. 11B. However, it can be appreciated that the definition of the colors is enhanced by enhancing the color values of the images shown in FIG. 11C, as compared to FIG. 11B.

Figure 12:
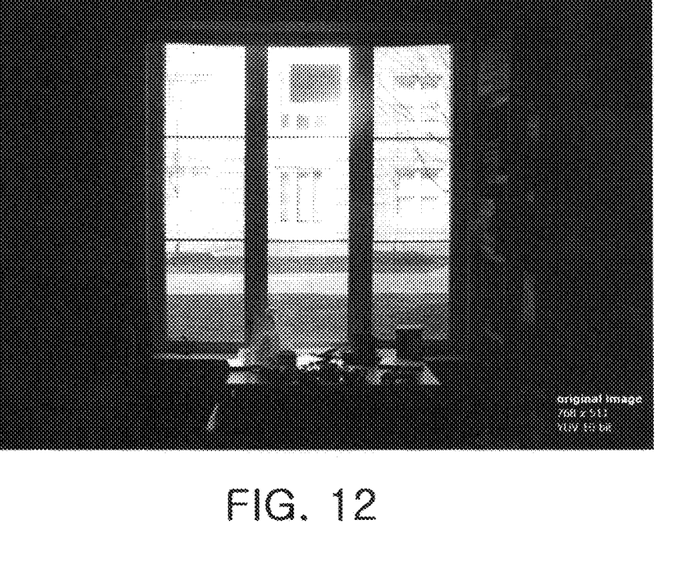
FIGS. 12 and 13 are diagrams comparing the input images with images output after the method for enhancing the visibility of color images, according to the present invention, has been applied to the input images.
Figure 13:
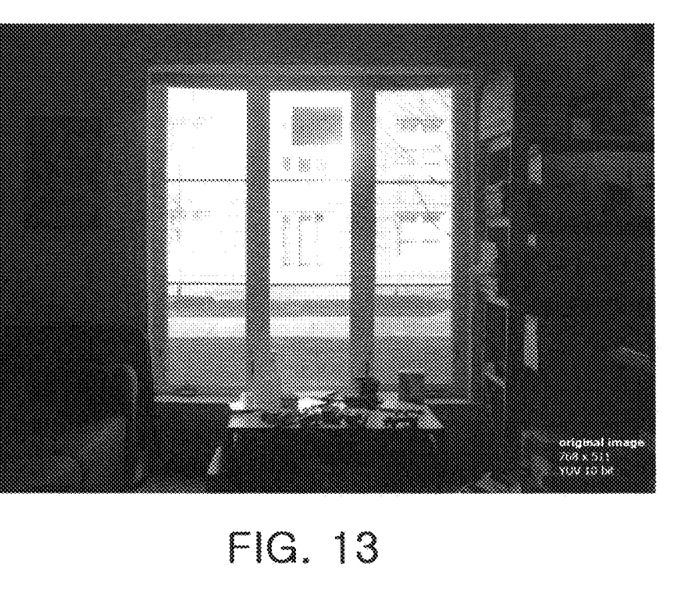

Further, FIGS. 12 and 13 are diagrams comparing the input images with the images output after the method for enhancing the visibility of color images, according to the present invention, is applied to the input images. Comparing FIGS. 12 and 13, it can be appreciated that the details of the dark portions are clearly enhanced in the input images in which the bright region and the dark region are clearly differentiated from each other by applying the method for enhancing the visibility according to the present invention.

As set forth above, the present invention can enhance the visibility of color images by processing images in real time using a software method without adding the hardware resources or performing the complicated operation.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for enhancing the visibility of color images, the method comprising:
    calculating a histogram of a number of pixels for luminance values of input images and calculating a cumulative distribution function of the number of pixels from a minimum value of the luminance values by using the histogram;
    determining the luminance values corresponding to the number of pixels according to a previously set ratio to have small luminance values in the luminance value cumulative distribution function as a threshold level for determining baseband signals and determining the pixels having the luminance values smaller than the threshold level to be baseband signal pixels;
    generating luminance compensation values to apply lower-level luminance compensation values as the pixels have higher-level luminance values, for the pixels having luminance values larger than the threshold level;
    determining a luminance gain applied to the luminance compensation values according to mean luminance values of the input images and the level of the luminance values of the pixels to which the luminance compensation values are applied; and
    generating the images with the enhanced luminance values by multiplying the luminance compensation values by the gain and summing the luminance compensation values multiplied by the gain with the luminance values of the input images.

2. The method for enhancing the visibility of the color images of claim 1, wherein the calculating of the cumulative distribution function includes converting a color space of the input images into a YCbCr color space.

3. The method for enhancing the visibility of color images of claim 1, wherein the previously set ratio is determined as 1 to 5% of a total number of pixels having the input images.

4. The method for enhancing the visibility of color images of claim 1, wherein the generating of the luminance compensation values generates the luminance compensation values by the following Equations 1 to 3:

$$P = (1 - Y/Y_{max})^\gamma \times Y_{max} \qquad \text{Equation 1}$$

$$P' = \frac{P \times (Y_{max} - Y)}{Y_{max}} \qquad \text{Equation 2}$$

$$P_{final} = \left(\frac{P'}{Y_{max}}\right)^2 \times Y \qquad \text{Equation 3}$$

wherein Pfinal represents the luminance compensation values, Y represents the luminance values of the pixels, Ymax represents the maximum value in the luminance value range that can be included in the pixel, γ is any values larger than 0 and smaller than 1.

5. The method for enhancing the visibility of color images of claim 1, wherein the determining of the luminance gain generates the luminance gain so that the luminance gain and the level of the luminance values of the pixels have the relation of a linear function having a slope and an intercept determined by a mean luminance value of the input images.

6. The method for enhancing the visibility of color images of claim 5, wherein the maximum value and the minimum value of the luminance gain are previously set and the previously set maximum value and minimum value are determined as the luminance gain, for the pixels having a luminance gain out of the previously set maximum value or minimum value according to the linear function.

7. The method for enhancing the visibility of color images of claim 1, wherein the generating of the luminance gain generates the larger luminance gain as the pixels have the low-level luminance values for the a image having a mean luminance value lower than a previously set reference value and sets the smaller luminance gain as the pixels have the low-level luminance values for a bright image having a mean luminance value higher than the previously set reference value.

8. The method for enhancing the visibility of color images of claim 1, further comprising calculating a size ratio of the luminance values of each pixel among pixels of the input images and the luminance values of each pixel among pixels of the images with the enhanced luminance values and changing color values by applying the size ratio to the color values of each pixel among the pixels of the images with the enhanced luminance values.

9. The method for enhancing the visibility of color images of claim 8, further comprising:
calculating the size ratio of the luminance values of each pixel of the input images and the luminance values of each pixel of the images with the enhanced luminance values;
determining a color gain according to the luminance values of each pixel of the images with the enhanced luminance values;
outputting the change color values by multiplying the color values of each pixel of the images with the enhanced luminance values by the size ratio and the color gain.

10. The method for enhancing the visibility of color images of claim 9, wherein the determining of the color gain determines the color gain as the larger values as the pixels have the low-level luminance values in the images with the enhanced luminance values.

11. The method for enhancing the visibility of color images of claim 8, wherein the changing of the color values outputs the color values determined by the following Equations 7 to 9:

$$Y_{ratio} = \frac{Y_{final}}{Y} \qquad \text{Equation 7}$$

$$Cb_c = Cb \times Y_{ratio} \qquad \text{Equation 8}$$
$$Cr_c = Cr \times Y_{ratio}$$

$$Cb_{final} = G_{color} \times Cb_c \qquad \text{Equation 9}$$
$$Cr_{final} = G_{color} \times Cr_c$$

wherein Yratio represents the size ratio of the luminance values of the images output from the luminance value enhancing unit and the luminance values of the input images, Yfinal represents the luminance values of the images output from the luminance value enhancing unit, Cbc and Crc represent the compensation values for enhancing the color values, Cb and Cr represent the color values of the input images or the image data output from the luminance value enhancing unit, Cbfinal and Crfinal represent the color values output from the color value enhancing unit, and Gcolor represents the color gain.

* * * * *